US012771748B2

(12) United States Patent
Bentsionov et al.

(10) Patent No.: US 12,771,748 B2
(45) Date of Patent: Oct. 20, 2026

(54) RAILWAY CONTROL AND FIELD DEVICE SWITCHING SYSTEM

(71) Applicant: HITACHI RAIL STS USA, INC., Pittsburgh, PA (US)

(72) Inventors: Igor Bentsionov, Pittsburgh, PA (US); Dmitriy Chelobanov, Wexford, PA (US)

(73) Assignee: HITACHI RAIL STS USA, INC., Pittsburgh, PA (US)

( * ) Notice: Subject to any disclaimer, the term of this patent is extended or adjusted under 35 U.S.C. 154(b) by 101 days.

(21) Appl. No.: 18/991,914

(22) Filed: Dec. 23, 2024

(65) Prior Publication Data

US 2026/0181046 A1 Jun. 25, 2026

(51) Int. Cl.

| | |
|---|---|
| ***H04L 67/12*** | (2022.01) |
| ***B61L 5/10*** | (2006.01) |
| ***B61L 29/28*** | (2006.01) |

(52) U.S. Cl.

CPC .............. *H04L 67/12* (2013.01); *B61L 5/102* (2013.01); *B61L 29/28* (2013.01)

(58) Field of Classification Search

CPC ........... H04L 67/12; B61L 5/102; B61L 29/28

See application file for complete search history.

(56) References Cited

U.S. PATENT DOCUMENTS

| | | | | |
|---|---|---|---|---|
| 7,577,502 B1 * | 8/2009 | Henry | B61L 5/102 | 340/439 |
| 2008/0183306 A1 * | 7/2008 | Ashraf | B61L 29/28 | 246/125 |
| 2014/0360399 A1 * | 12/2014 | Rees | A63H 19/24 | 104/295 |
| 2021/0171072 A1 * | 6/2021 | Hamilton | B61K 9/08 | |

* cited by examiner

*Primary Examiner* — Barbara B Anyan

(74) *Attorney, Agent, or Firm* — Eckert Seamans Cherin & Mellott, LLC

(57) ABSTRACT

A switching system for selectively connecting railway field devices with a first control system or a second control system. The switching system includes a first plug panel including a number of first plugs structured to connect to the field devices, the first control system, and the second control system, a plurality of first relays structured to selectively connect one of the first plugs with another of the first plugs, the plurality of first relays having a first position in which first plugs corresponding with the first control system are connected with first plugs corresponding to the field devices and a second position in which first plugs corresponding with the second control system are connected with first plugs corresponding to the field devices, and a controller structured to control the first relays to selectively set the first relays to the first position or the second position.

20 Claims, 13 Drawing Sheets

RAILWAY CONTROL AND FIELD DEVICE SWITCHING SYSTEM

FIELD OF THE INVENTION

The disclosed concept relates generally to switching systems, and in particular, to switching systems for railway control and field devices.

BACKGROUND OF THE INVENTION

Railway systems include a control system and field devices. The field devices include devices such as wayside signals, switch machines, push buttons, or other devices that are located along the railway. The field devices communicate with and/or are controlled by the control system. The control system is often located in a control command center or other centralized location. In order for the control system to communicate or control the field devices, there is a connection (e.g., wired connection) between the control system and the field devices.

Railway systems are typically in revenue service for the majority of their time. Revenue service refers to the time in which the railway system is in normal operation, such as carrying passengers or freight. Railway systems typically have limited periods where they are not in revenue service. The time when the railway system is not in revenue service may be referred to as a testing period.

When new equipment, such as a new control system, is to be installed in the railway system, the new equipment must be tested in the railway system. The testing must occur when the railway system is not in revenue service (i.e., during the testing period). However, to test a new control system, the existing control system must first be disconnected from the field devices and the new control system must be connected to the field devices. Further, before the next revenue service begins, the new control system must be disconnected from the field devices and the existing control system must be reconnected to the field devices. As the testing period is limited, much of the testing period could be used connecting and disconnecting the control systems and field devices, leaving less time for any testing that must be performed before the new control system is qualified for use in revenue service. The time spent by technicians performing the connecting and disconnecting increases costs as well as delays qualifying the new control system for revenue service.

There is room for improvement in switching systems for railway control and field devices.

SUMMARY OF THE INVENTION

In accordance with an aspect of the disclosed concept, a switching system for selectively connecting railway field devices with a first control system or a second control system comprises: a first plug panel including a number of first plugs structured to connect to the field devices, the first control system, and the second control system; a plurality of first relays structured to selectively connect one of the first plugs with another of the first plugs, the plurality of first relays having a first position in which first plugs corresponding with the first control system are connected with first plugs corresponding to the field devices and a second position in which first plugs corresponding with the second control system are connected with first plugs corresponding to the field devices; and a controller structured to control the first relays to selectively set the first relays to the first position or the second position.

In accordance with an aspect of the disclosed concept, a railway control system comprises: a number of railway field devices; a first control system structured to communicate with the number of railway field devices; a second control system structured to communicate with the number of railway field devices; a switching system for selectively connecting the number of railway field devices with the first control system or the second control system, the switching system including: a first plug panel including a number of first plugs structured to connect to the field devices, the first control system, and the second control system; a plurality of first relays structured to selectively connect one of the first plugs with another of the first plugs, the plurality of first relays having a first position in which first plugs corresponding with the first control system are connected with first plugs corresponding to the field devices and a second position in which first plugs corresponding with the second control system are connected with first plugs corresponding to the field devices; and a controller structured to control the first relays to selectively set the first relays to the first position or the second position.

In accordance with an aspect of the disclosed concept, a remote switching system for selectively connecting railway field devices with a first control system or a second control system, the remote switching system comprising: a local switching system including: a first plug panel including a number of first plugs structured to connect to the field devices, the first control system, and the second control system; a plurality of first relays structured to selectively connect one of the first plugs with another of the first plugs, the plurality of first relays having a first position in which first plugs corresponding with the first control system are connected with first plugs corresponding to the field devices and a second position in which first plugs corresponding with the second control system are connected with first plugs corresponding to the field devices; and a first controller structured to control the first relays to selectively set the first relays to the first position or the second position; and a remote switching cabinet including: a second controller structured to communicate with and control the first controller, and wherein the first controller is structured to control the position of the plurality of first relays in response to communication from the second controller.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
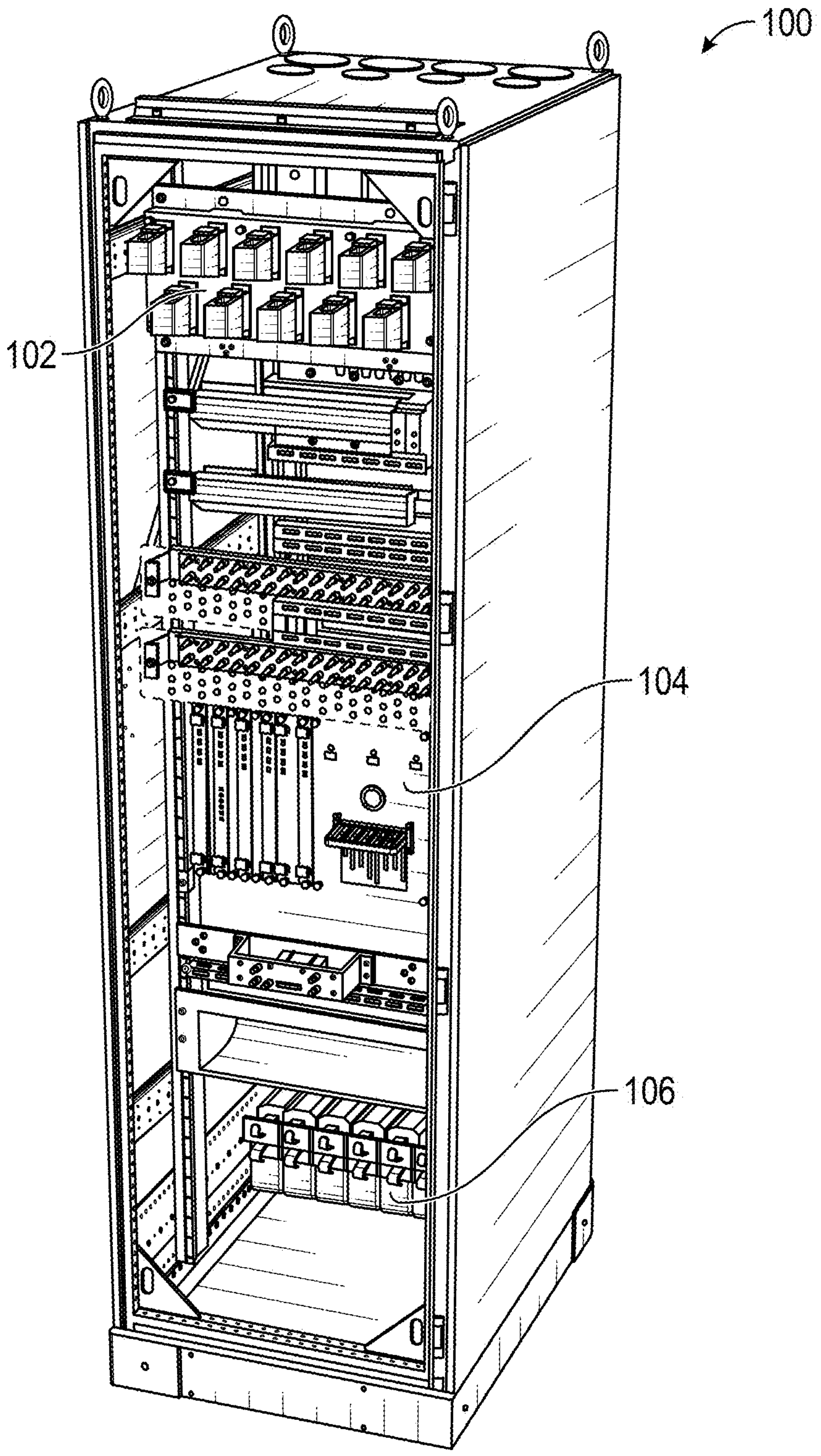
FIG. 1 is a view of a switching system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

Figure 2:
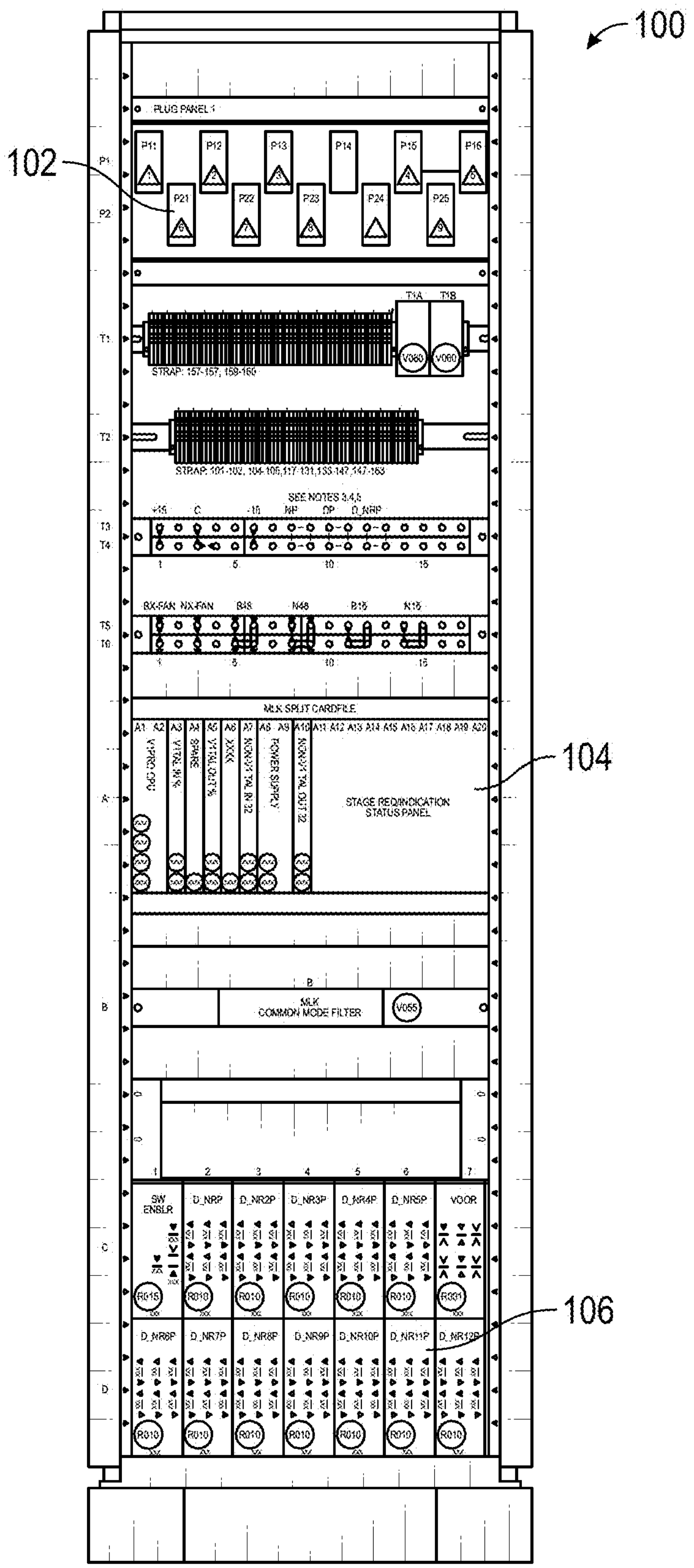
FIG. 2 is a schematic diagram of the switching system of FIG. 1.
Figure 3:
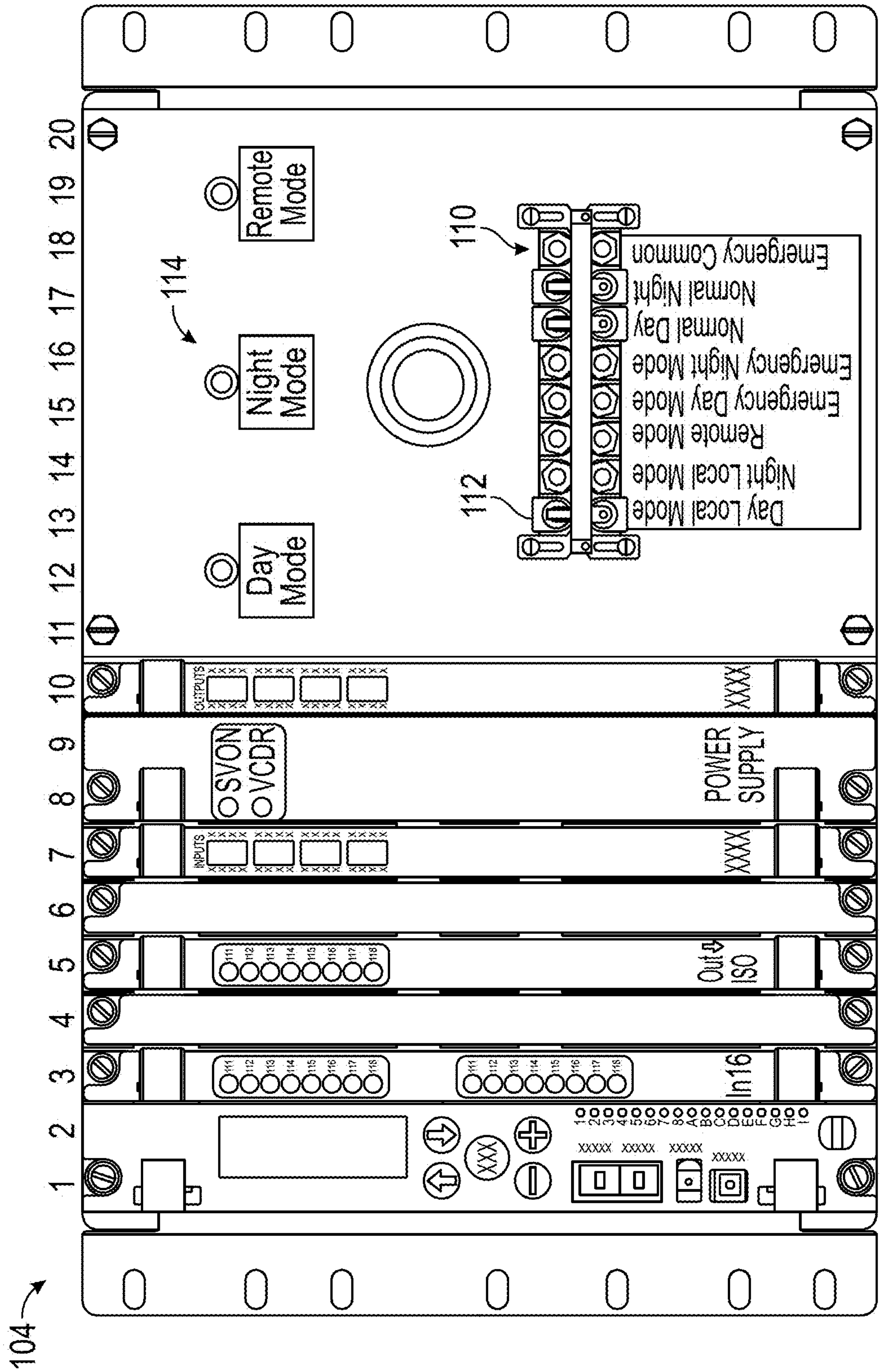
FIG. 3 is a detail view of a control and status panel of the switching system of FIG. 1 in accordance with an example embodiment of the disclosed concept.

FIG. 1 is a view of a switching system 100 in accordance with an example embodiment of the disclosed concept. FIG. 2 is a schematic diagram of the switching system 100 of FIG. 1. FIG. 3 is a detail view of a control and status panel 104 of the switching system 100 of FIG. 1.

The switching system 100 is configured to be connected between a control system of a railway and field devices for the railway. More particularly, the switching system 100 is configured to be connected between multiple controls systems and a single set of field devices. The switching system 100 is configured to selectively connect one of the multiple control systems with the field devices.

The switching system 100 includes a plug panel 102, a control and status panel 104, and polarized relays 106. The plug panel 102 includes a number of plugs structured to allow for connection to the multiple controls systems and the field devices. The polarized relays 106 are connected between the plugs and are structured to switch which plugs are electrically connected to each other. For example, when the polarized relays 106 are in a first position, plugs corresponding to a first control system are connected to plugs corresponding to the field devices, and when the polarized relays 106 are in a second position, plugs corresponding to a second control system are connected to plugs corresponding to the field devices. In this manner, changing the position of the polarized relays 106 changes which control system is connected to the field devices. In some example embodiments, the polarized relays 106 are polarized and their position is controlled by a polarity applied to the relay. Further, in some example embodiments, the polarized relays 106 retain their position when power is lost.

The control and status panel 104 includes a controller structured to control the position of the polarized relays 106. In some example embodiments, the controller is electrically connected to the polarized relays 106 and is structured to apply selected polarities to the polarized relays 106 to control their position. In some example embodiments, the controller is connected to a first one and a last one of the polarized relays 106 and the polarized relays 106 are sequentially connected with each other such that changing the position of the first polarized relay 106 causes the position of the second polarized relay 106 and so on until the position of the last polarized relay 106 is changed. In this example embodiment, the controller is structured to control the position of the first polarized relay 106 and to sense the position of the last polarized relay 106. In this manner, when the controller controls the first polarized relay 106 to change position and senses that the last polarized relay 106 has also changed position, the controller can verify that all of the polarized relays 106 have changed position as each polarized relay 106 must change position to cause the next polarized relay 106 to change position.

The control and status panel 104 further includes a status panel structured to indicate a status of the switching system 100. In some example embodiments, the control and status panel 104 includes indicators 114, as shown in FIG. 3, such as light emitting diodes (LEDs), to indicate the status of the switching system 100. In the example shown in FIG. 3, the statuses of the switching system 100 include day mode, night mode, and remote mode. Day mode corresponds to when an existing control system is connected to the field devices, such as when the railway is operating in revenue service. Night mode corresponds to when a new control system is connected to the field devices, such as when a new system is undergoing testing. Remote mode corresponds to when the switching system 100 is being controlled remotely, such as by a remote switching system that will be described in more detail with respect to FIGS. 10-13. It will be appreciated that the day mode, night mode, and remote mode statuses are provided as a non-limiting example of the types of statuses the switching system 100 may have. It will be appreciated that other statuses may be used without departing from the scope of the disclosed concept.

In some example embodiments of the disclosed concept, the switching system 100 requires two actions to switch which control system is connected to the field devices (e.g., to switch between day and night modes). The first action is to select the mode of the switching system 100 with the controller. The selection may be input to the controller in any suitable manner. For example, a user may input the selection via a user device in communication with the controller. In some example embodiments, a user interface may be included on the controller. In an example embodiment, the control and status panel 104 includes a jumper panel 110 and jumpers 112. The jumper panel 110 includes a number of jumper positions corresponding to various modes of the switching system 100. The second action to change the mode of the switching system 100 is to place the jumpers 112 in positions corresponding to the selected mode. Once a mode is selected with the controller, the controller will sense the position of the jumpers 112, and, in response to sensing the jumpers 112 in a position corresponding to the selected mode, will control the switching system 100 to change to the selected mode. For example, to switch from day mode (e.g., the existing control system is connected to the field devices) to night mode (e.g., the new control system is connected to the field devices), a user would need to select night mode with the controller (e.g., a first action) and change the jumpers 112 to the position corresponding to night mode (i.e., a second action). Requiring two actions to switch modes of the switching system 100 prevents an inadvertent switching of modes. In the example embodiment described above, the two actions are selecting the mode with controller and moving jumpers 112. However, it will be appreciated that other actions may be employed. For example, flipping a switch or pressing a button may be one of the two actions. While some non-limiting examples of actions are provided, it will be appreciated that various types of actions may be employed without departing from the scope of the disclosed concept.

Figure 4:
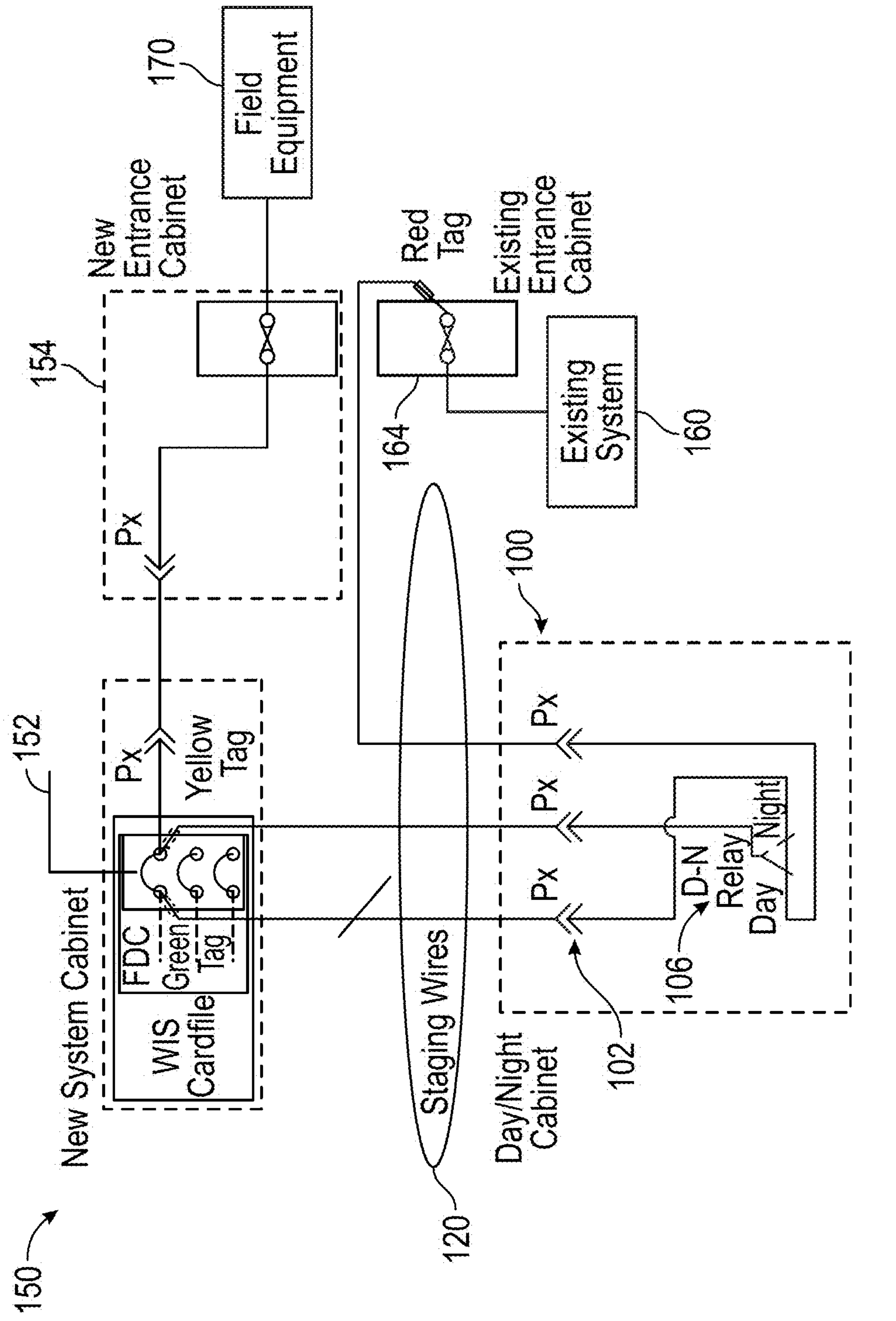
FIG. 4 is a schematic diagram of a railway control system including a switching cabinet in accordance with an example embodiment of the disclosed concept.

FIG. 4 is a schematic diagram of a railway control system including a switching system 100 in accordance with an example embodiment of the disclosed concept. FIG. 4 shows the various interconnections between an existing control system 160, a new control system 150, field devices 170 (e.g. field equipment), and the switching system 100. In the example shown in FIG. 4, an existing entrance cabinet 164 and a new entrance cabinet 154 are employed. An entrance cabinet is structured to receive connections from the field devices 170 and pass the connections through to the control system. In the example shown in FIG. 4, the existing control system 160 and existing entrance cabinet 164 will remain in use until the new control system 150 is completed testing and ready for service. Once the new control system 150 is placed in service, the existing control system 160 and existing entrance cabinet 164 can be removed from service and the new control system 150 and new entrance cabinet 154 will be used in service.

In the example shown in FIG. 4, the field devices 170 are connected to the new entrance cabinet 154. The connection is passed through to the new control system 150. A jumper 152 in the new control system 150 includes a first side connection and a second side connection. The first side connection is connected to an input/output of the new control system 150. The first side connection is also connected to staging wires 120 that connect to the switching system 100. The second side connection is connected to the new entrance cabinet 154. The second side connection is also connected to staging wires 120 connected to the switching system 100. While the new control system 150 is being tested, the jumper 152 is removed, thus isolating the first side connection from the second side connection.

The switching system 100 includes staging wires 120 connected to the plugs of the plug panel 102. The staging wires 120 include first staging wires connected to the existing entrance cabinet 164 where they are passed through to the existing control system 160, second staging wires that are connected to the second side connection of the new control system 150, and third staging wires that are connected to the first side connection of the new control system 150. The switching system 100 is structured to control the polarized relays 106 to selectively connect either the first staging wires to the second staging wires, or the third staging wires to the second staging wires. When the first staging wires are connected to the second staging wires, inputs/outputs of the existing control system 160 are passed through the existing entrance cabinet 164 through the switching system 100 to the second side connection of the new control system 150, and on through the new entrance cabinet 154 to the field devices 170. In other words, the existing control system 160 is connected to the field device 170 (e.g., a day mode). When the third staging wires are connected to the second staging wires, the inputs/outputs of the new control system 150 are connected via the first side connection to the switching system 100 via the third staging wires. The inputs/outputs are passed through the switching system 100 to the second side connection via the second staging wires and on through the new entrance cabinet 154 to the field devices 170. In other words, the new control system 150 is connected to the field devices 170 (e.g., a night mode). In this manner, controlling the polarized relays 106 to selectively connect either the first or third staging wires to the second staging wires selectively connects either the existing control system 160 or the new control system 150 to the field devices 170. As such, while the railway is in revenue service, the existing control system 160 can be connected to the field devices 170, and when not in revenue service, the switching system 100 can quickly connect the new control system 150 to the field devices 170 to perform testing and qualification of the new control system 150. Once the new control system 150 is ready for service, the switching system 100 and staging wires 120 may be removed, and the jumper 152 may be inserted into its position between the first and second side connections, thus connecting the inputs/outputs of the new control system 150 to the field devices 170 via the new entrance cabinet 154. The existing system 160 and existing entrance cabinet 164 may also then be removed and the new control system 150 and new entrance cabinet 154 will fully be in service.

Figure 5:
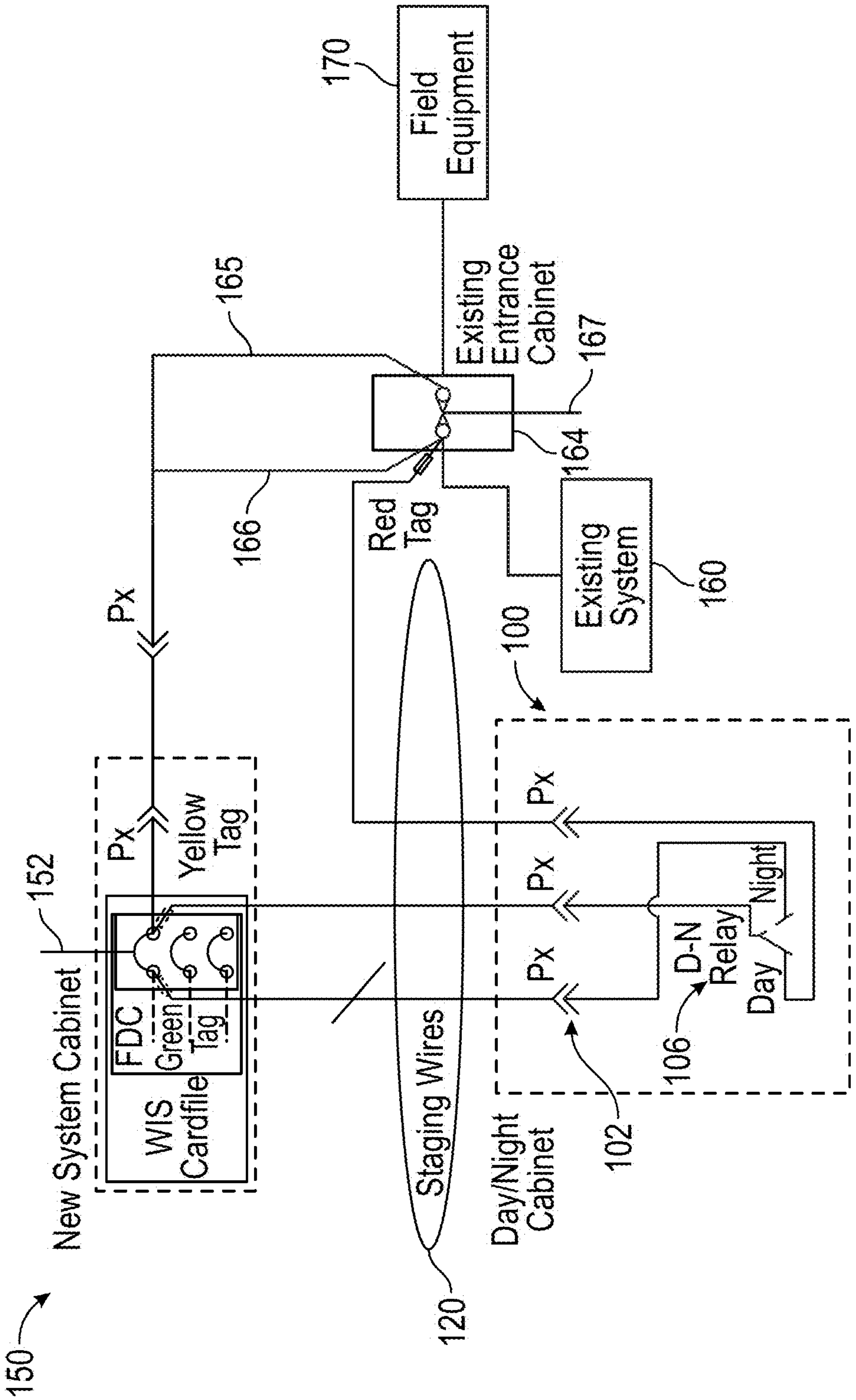
FIG. 5 is a schematic diagram of another railway control system including a switching cabinet in accordance with an example embodiment of the disclosed concept.

FIG. 5 is a schematic diagram of another railway control system including a switching cabinet 100 in accordance with an example embodiment of the disclosed concept. The arrangement in FIG. 5 is similar to the arrangement in FIG. 4. However, in the arrangement in FIG. 5, the existing entrance cabinet 164 will continue in use after the new control system 150 has been put into service. In the arrangement in FIG. 5, the first staging wires are connected between an input/output of the existing control system 160 and the switching system 100. Further, a test link 167 between an input and output of the existing entrance cabinet 164 is removed while the new control system 150 is being tested. Additionally, an input/output of the new control system 150 is connected to a field side (position 165) of the existing entrance cabinet 164 while the new control system 150 is being tested. As in the arrangement in FIG. 4, the jumper 152 is removed while the new control system 150 is being tested. Thus, while the new control system 150 is being tested and qualified, controlling the polarized relays 106 to connect the first staging wires to the second staging wires causes inputs/outputs of the existing control system 160 to pass through the switching system 100, through the second side connection of the new control system 150 to the field devices 170 via the field side connection (position 165) of the existing entrance cabinet 164. Controlling the polarized relays 106 to connect the third staging wires to the second staging wires causes inputs/outputs of the new control system 150 to pass through the switching system 100 to the second side connection of the new control system 150 and on to the field devices 170 via the field side connection (position 165) of the existing entrance cabinet 164. Thus, controlling the switching system 100 to selectively connect the second staging wires to the first or third staging wires can quickly switch between the existing control system 160 being connected to the field devices 170 (e.g., a day mode) and the new control system 150 being connected to the field devices 170 (e.g., a night mode). The day mode can be used while in revenue service and the switching system 100 can be used to switch to the night mode when not in revenue service such that the new control system 150 can be tested and qualified while the railway is not in revenue service.

Once the new control system 150 is tested and qualified, the input/output of the new control system 150 may be connected to a room side of the existing entrance cabinet 164 (position 166). The test link 167 between inputs and outputs of the existing entrance cabinet 164 and the jumper 152 may be replaced between the first and second side connections in the new control system 150. The staging wires 120 and the existing control system 160 may also be removed, thus leaving outputs of the new control system 150 connected to the field devices 170 via the jumper 152 and the existing entrance cabinet 154, with the new control system 150 fully in service.

Figure 6:
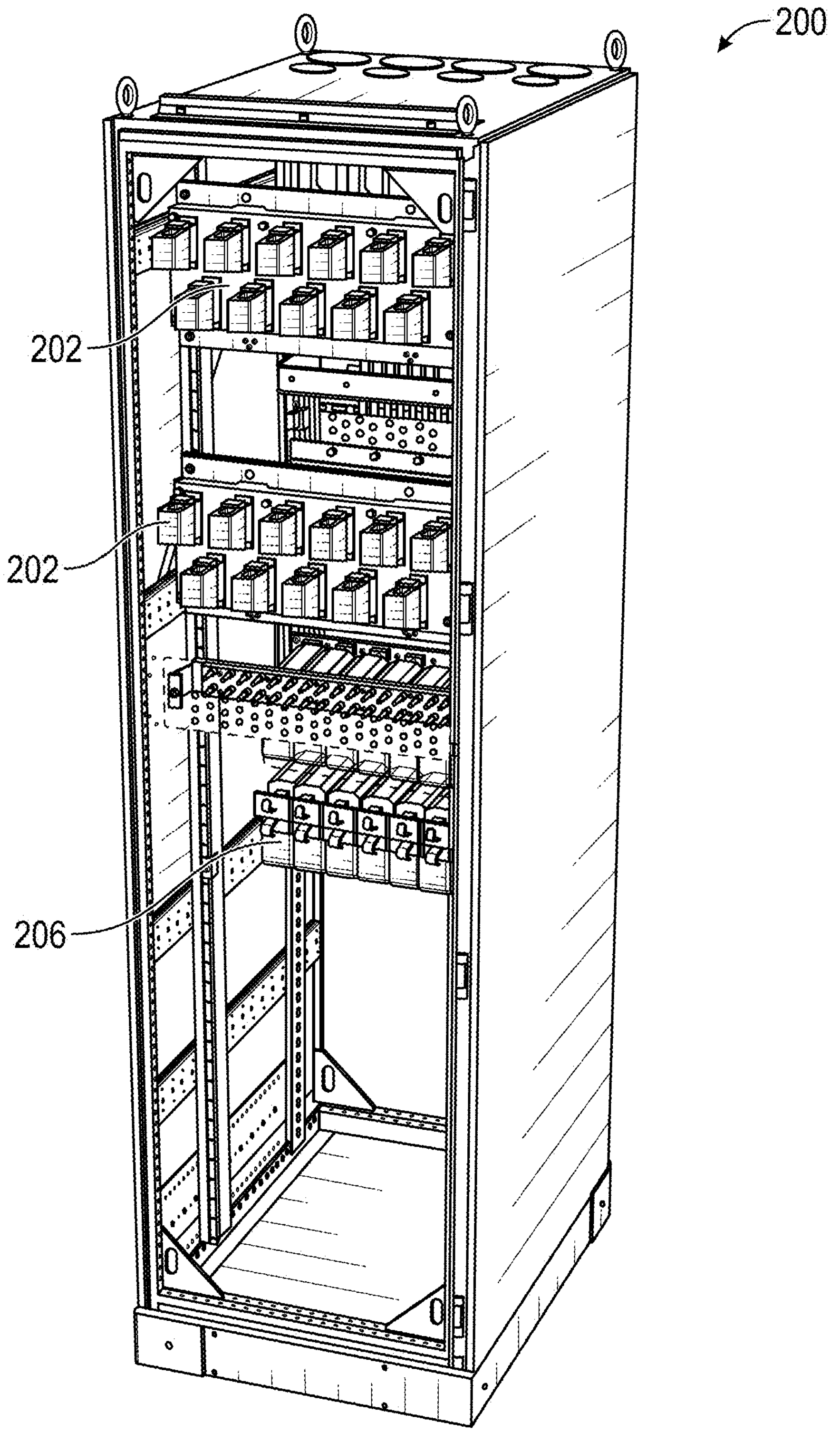
FIG. 6 is a view of an extended switching system in accordance with an example embodiment of the disclosed concept.
Figure 7:
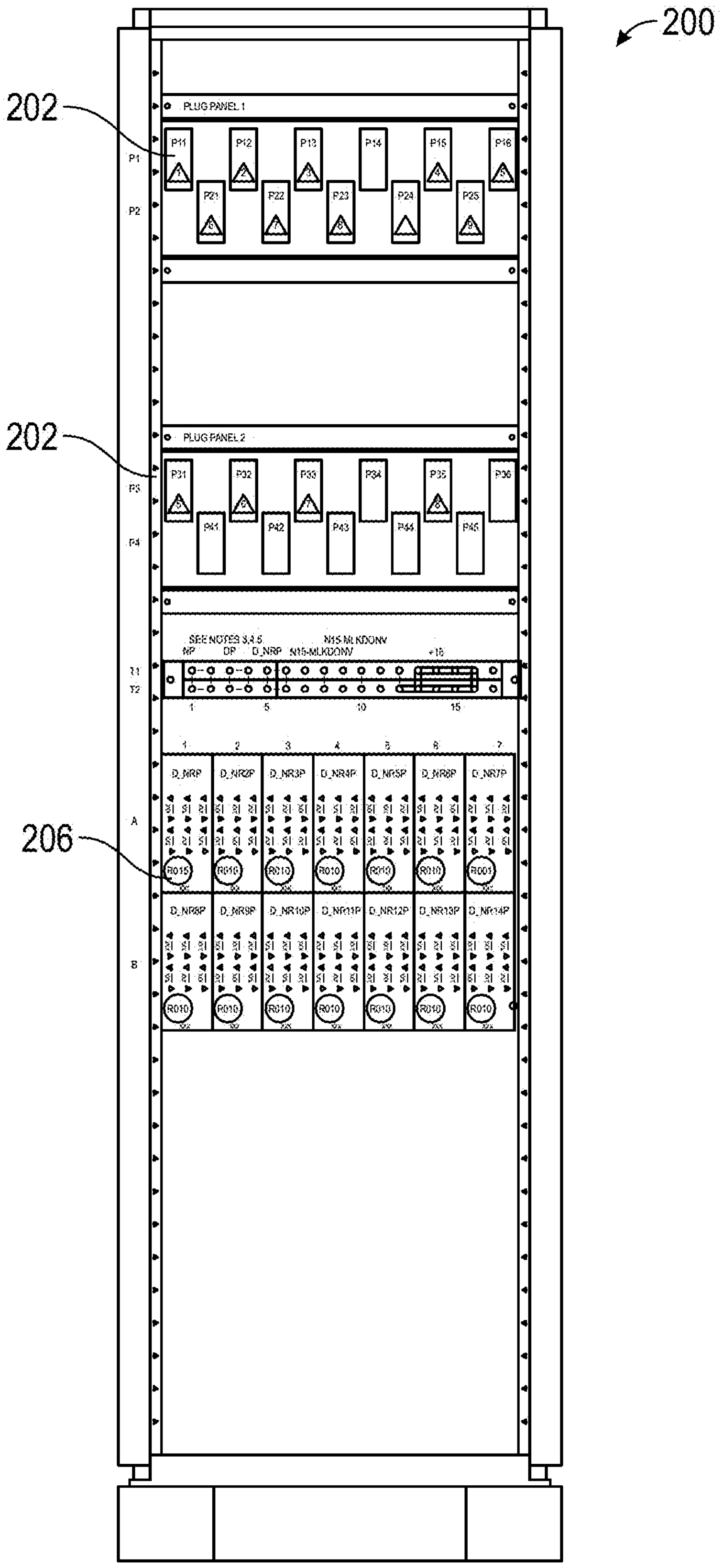
FIG. 7 is a schematic diagram of the extended switching system of FIG. 6.
Figure 8:
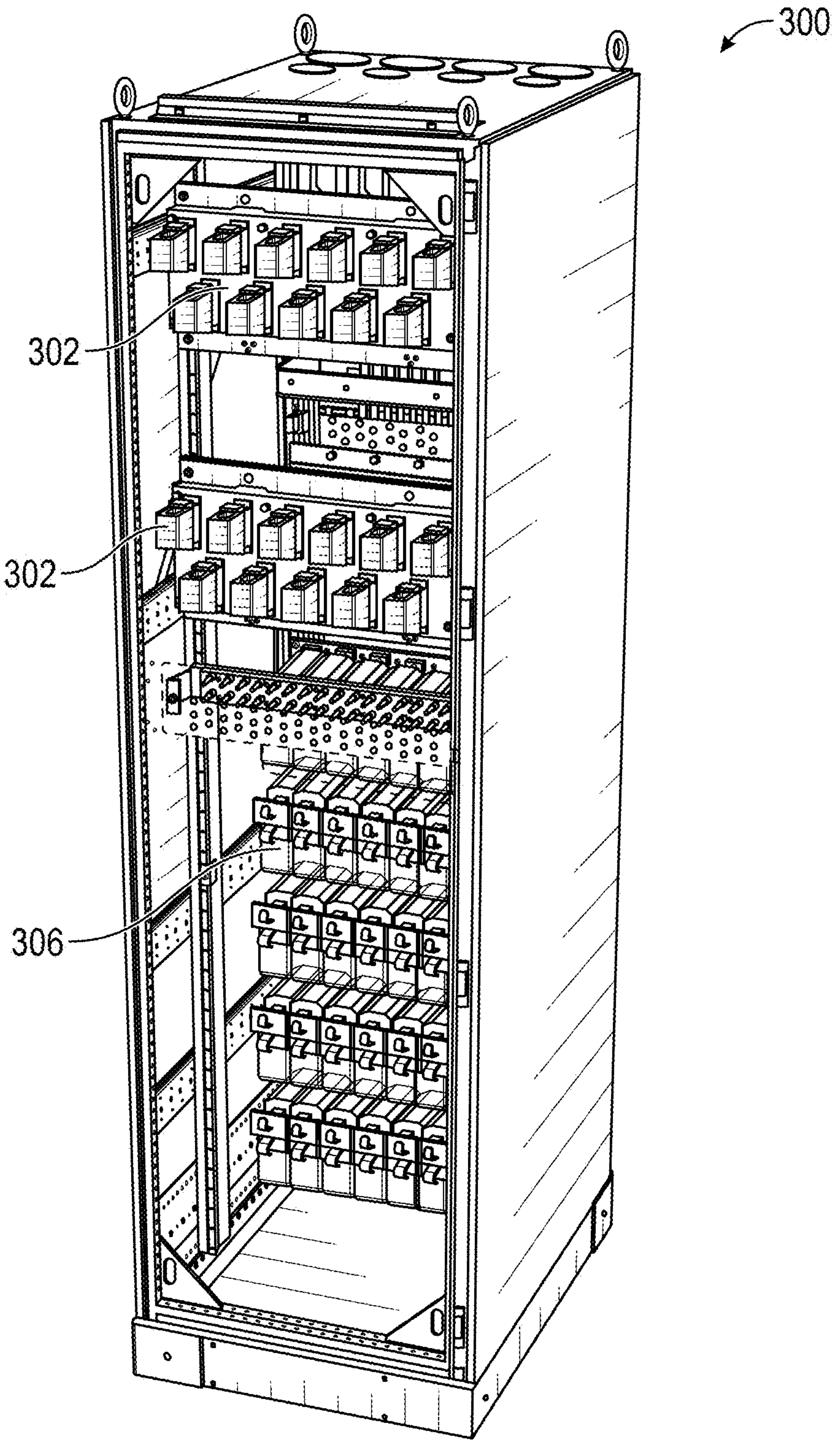
FIG. 8 is a view of a further extended switching system in accordance with an example embodiment of the disclosed concept.
Figure 9:
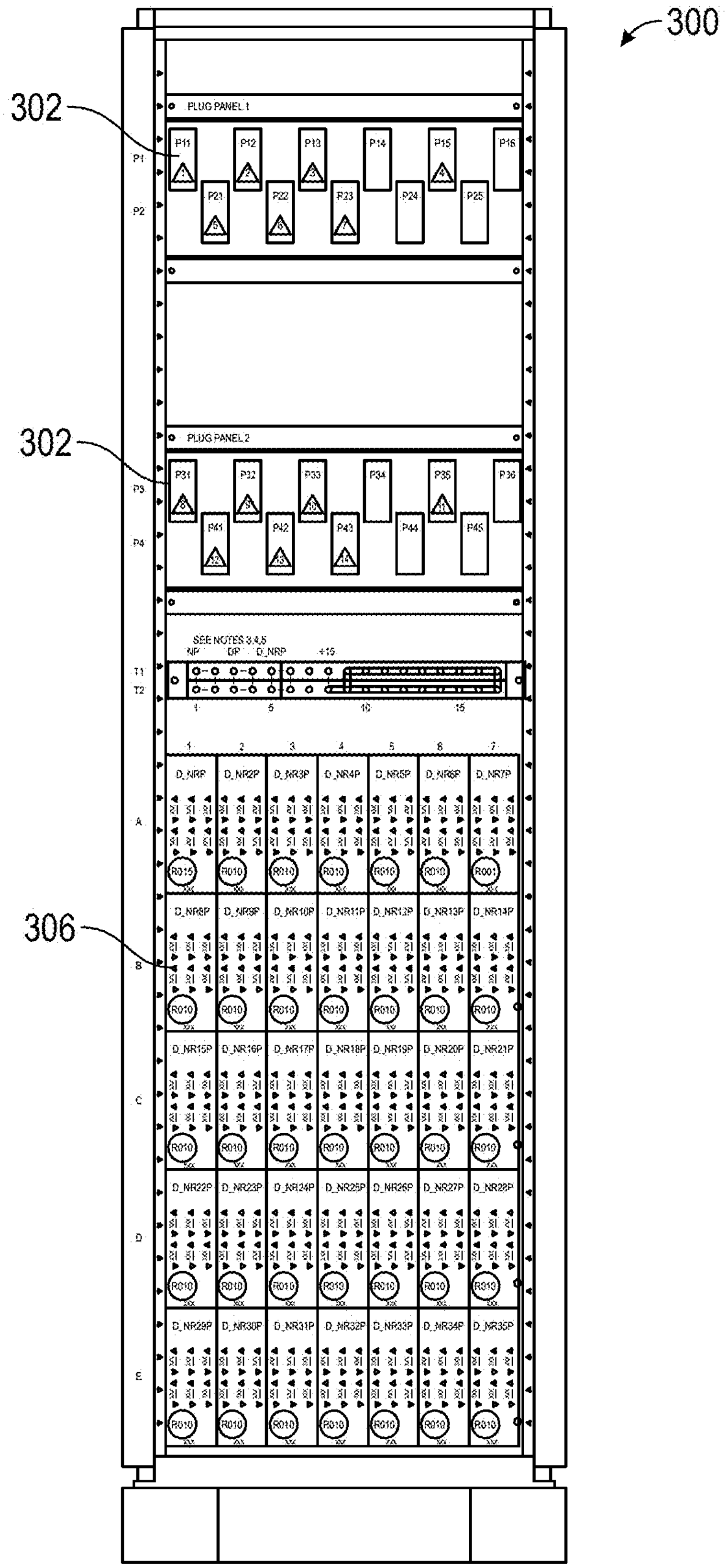
FIG. 9 is a schematic diagram of the further extended switching system of FIG. 8.

FIG. 6 is a view of an extended switching system 200 in accordance with an example embodiment of the disclosed concept. FIG. 7 is a schematic diagram of the extended switching system 200 of FIG. 6. FIG. 8 is a view of a further extended switching system 300 in accordance with an example embodiment of the disclosed concept. FIG. 9 is a schematic diagram of the further extended switching system 300 of FIG. 8. The extended switching system 200 and the further extended switching system 300 are intended to be used as extensions of the switching system 100. The extended switching system 200 includes one or more plug panels 202 and polarized relays 206 similar to the plug panel 102 and polarized relays 106 of the switching system 100. The further extended switching system 300 also includes one or more plug panels 302 and polarized relays 306 similar to the plug panel 102 and polarized relays 106 of the switching system 100. The extending switching system 200 and further extended switching system 300 differ from the switching system 100 in that the extended switching system 200 and further extended switching system 300 do not include the control and status panel 104. Rather, in an example embodiment, the polarized relays 106 are sequentially connected such that the position of a subsequent polarized relay 106 is controlled by the position of the previous polarized relay 106. The polarized relays 206,306 in the extended switching system 200 and further extended switching system 300 are arranged similarly. However, in the extended switching system 200 and further extended switching system 300, the first polarized relay 206,306 is sequentially connected to the last polarized relay in a prior switching system such that the positions of the polarized relays 206,306 will be controlled by the position of the polarized relays in the prior switching system. Thus, when the extended switching system 200 is connected to the switching system 100, when the controller of the switching system 100 causes its polarized relays 106 to change position, the sequential change will cause the polarized relays 206 in the extended switching system 200 to also change their positions. In this manner, multiple extended switching systems 200 and/or further extended switching systems 300 may be chained together after a first switching system 100 and may be controlled by the first switching system 100. The last polarized relay in the chain may be connected to the controller of the first switching system 100 to verify that the entire chain of polarized relays has changed position.

In some example embodiments, the switching system 100 and extended switching system may each include up to 12 polarized relays 106,206 and the further extended switching system 300 may include up to 35 polarized relays 306. In some example embodiments, size limitations may make it difficult to include a sufficient number of polarized relays 106 to accommodate the necessary connections to control systems and field devices. The ability to chain the switching system 100 with extended switching systems 200 and further extended switching systems 300 make it easier to accommodate more connections while retaining the ability to control the mode of the overall chain at the first switching system 100.

In some example embodiments, the switching system 100 may be controlled remotely. It will be appreciated that in some example embodiments, the switching system 100 may include a remote mode, which enables the switching system 100 to be controlled remotely. In some example embodiments, changing the switching system 100 to the remote mode may require two actions, such as for example and without limitation, selecting the remote mode with the controller and changing the position of the jumper 112. However, it will be appreciated that different actions may be employed, or in some embodiments one action or no actions may be required. In some example embodiments, when the switching system 100 is in the remote mode, the switching system 100 may be controlled remotely, for example, by a remote switching system 400, as will be described herein.

Figure 10:
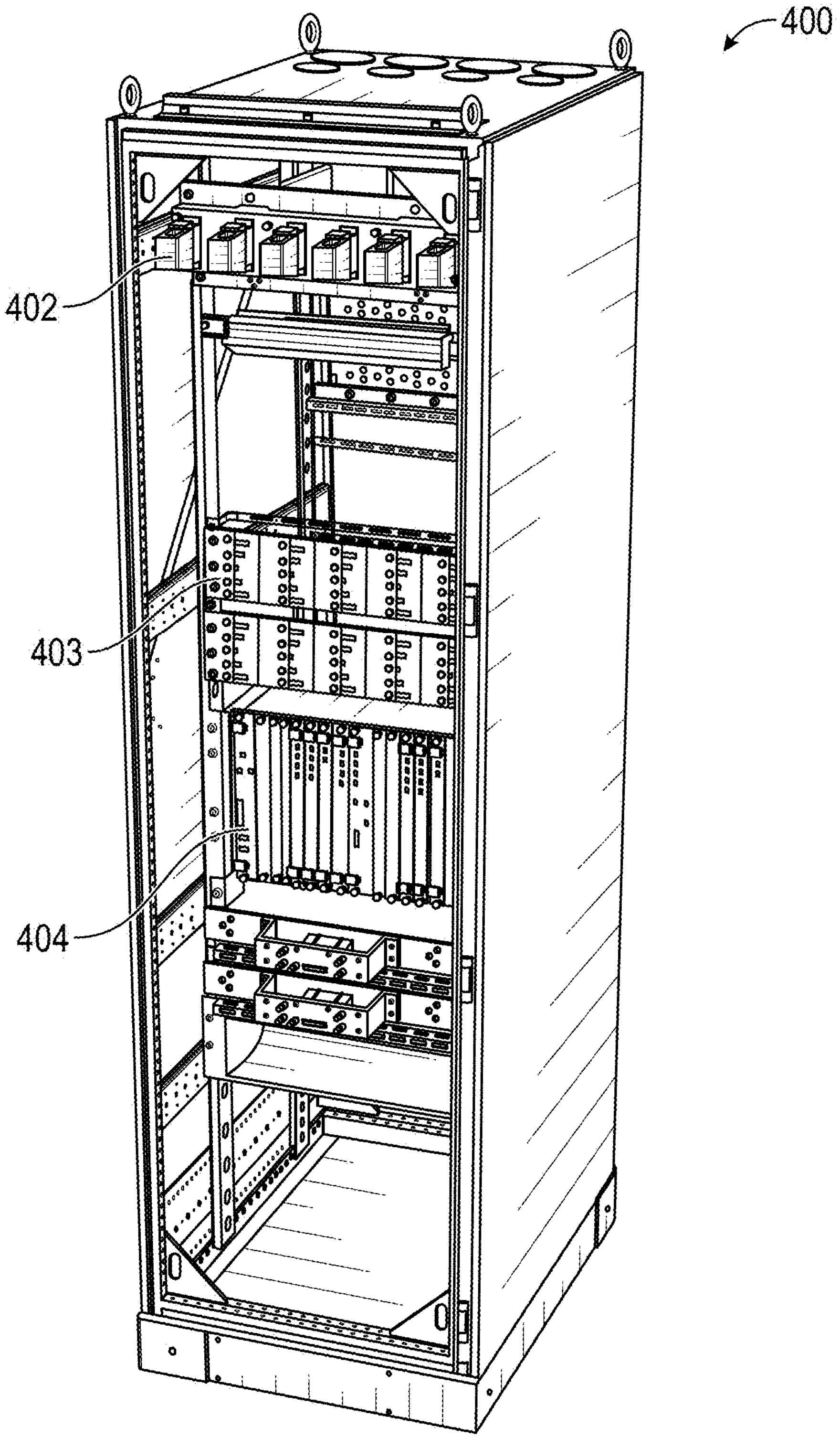
FIG. 10 is a view of a remote switching system in accordance with an example embodiment of the disclosed concept.
Figure 11:
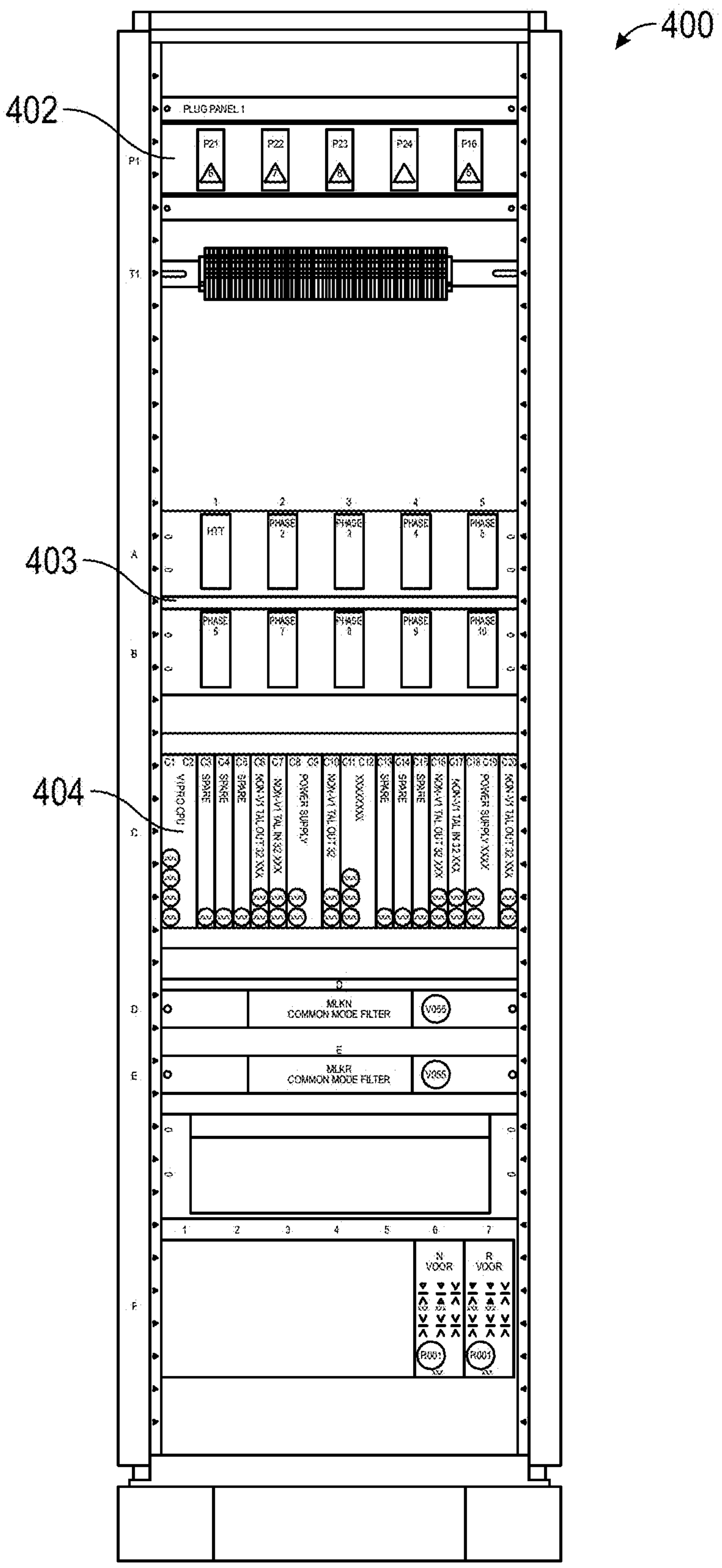
FIG. 11 is a schematic diagram of the remote switching system of FIG. 10.
Figure 12:
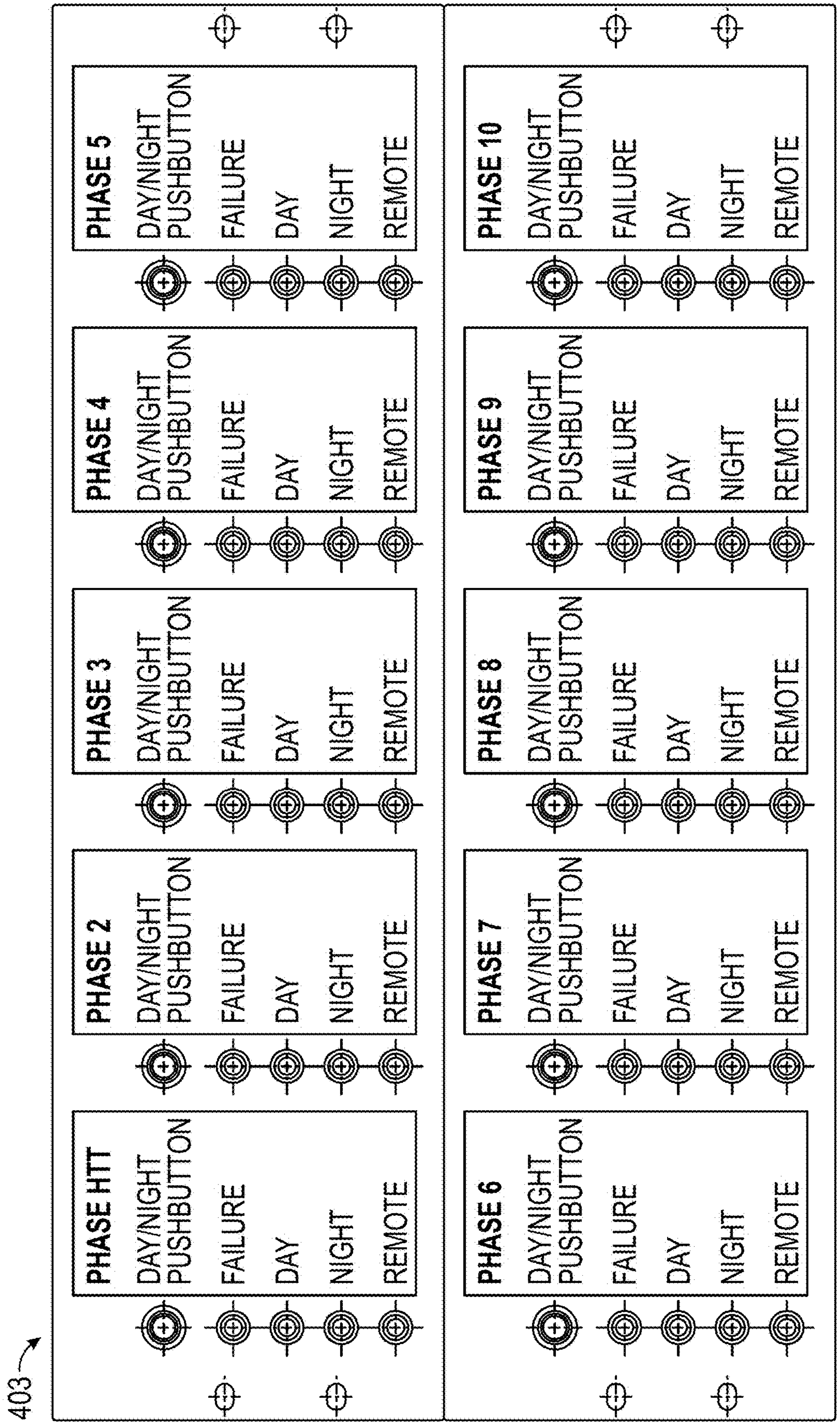
FIG. 12 is a detail view of a status panel of the remote switching system of FIG. 10.
Figure 13:
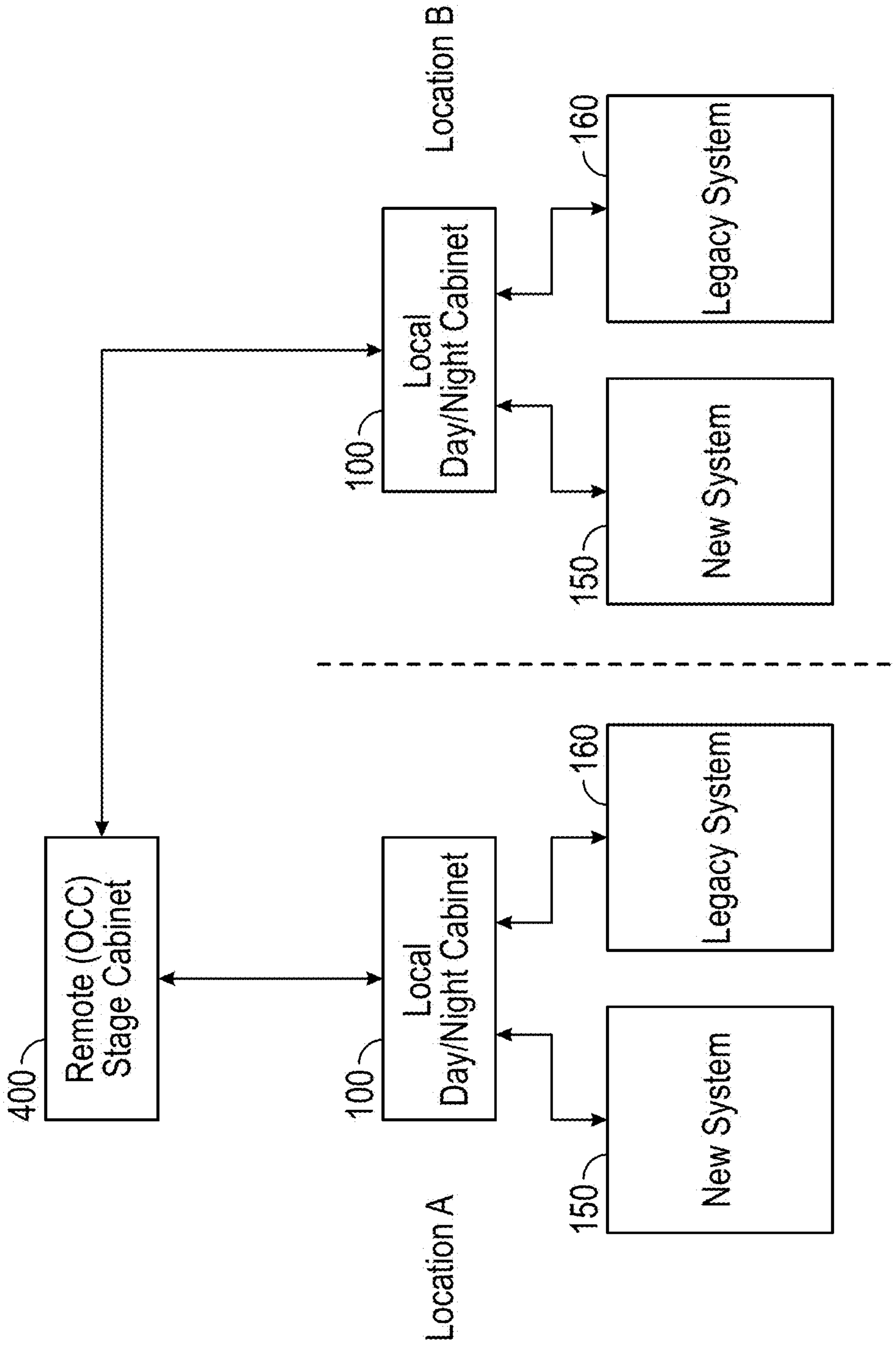
FIG. 13 is a schematic diagram of a railway control system including a remote switching system in accordance with an example embodiment of the disclosed concept.

FIG. 10 is a view of a remote switching system 400 in accordance with an example embodiment of the disclosed concept. FIG. 11 is a schematic diagram of the remote switching system 400 of FIG. 10. FIG. 12 is a detail view of a status panel 403 of the remote switching system 400 of FIG. 10. FIG. 13 is a schematic diagram of a railway control system including a remote switching system 400 in accordance with an example embodiment of the disclosed concept.

The remote switching system 400 includes a plug panel 402, a status panel 403, and a controller 404. The controller 404 is structured to communicate with and control the controllers of one or more switching systems 100 to cause the controllers of the one or more switching systems 100 to control the positions of their polarized relays 106. Thus, rather than controlling the switching system 100 by interacting with the control and status panels 104 of the switching systems 100, the switching systems 100 are able to be controlled remotely by the controller 404 of the remote switching system 400. The remote switching system 400 may be operated by a user device connected to the controller 404 or via an interface provided on the controller 404.

The status panel 403 may include one or more indicators to indicate the status of switching systems 100 connected to the remote switching system 400.

In the example embodiment shown in FIG. 13, the remote switching system 400 is connected to two switching systems 100. Each switching system 100 is connected to a new control system 150 and an existing control system 160. The remote switching system 400 is structured to individually control the modes of the switching systems 100. Thus, from the remote switching system 400, the modes of the switching systems 100 may be controlled between day and nights modes as needed to switch from revenue service to testing the new control systems 150 as needed.

In some example embodiments, the switching system 100 may include an emergency override. In some example embodiments the emergency override may be a position in the jumper panel 110. That is, placing the jumper 112 in the position corresponding to the emergency mode will place the switching system 100 in an emergency mode. In the emergency mode the polarized relays 106 will be placed in the first position where the existing control system 160 is connected to the field devices 170 regardless of an output of the controller. The emergency override may be useful in situations where the controller is not functioning properly. In some example embodiments, an indication of the failure of the controller is required to enter the emergency mode (e.g., without limitation, a hardware verification that the controller is not operational). The emergency override allows the switching system 100 to connect the field devices 170 with the existing control system 160 so that the railway may operate normally in revenue service even when there are issues with the switching system 100. The emergency override can cause the polarized relays 106 to be placed in the first position when the controller is not operational.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A switching system for selectively connecting railway field devices with a first control system or a second control system, the switching system comprising:

a first plug panel including a number of first plugs structured to connect to the field devices, the first control system, and the second control system;

a plurality of first relays structured to selectively connect one of the first plugs with another of the first plugs, the plurality of first relays having a first position in which first plugs corresponding with the first control system are connected with first plugs corresponding to the field devices and a second position in which first plugs corresponding with the second control system are connected with first plugs corresponding to the field devices; and a controller structured to control the first relays to selectively set the first relays to the first position or the second position.

2. The switching system of claim 1, wherein the plurality of first relays are polarized relays structured to retain their position without power.

3. The switching system of claim 1, wherein the plurality of first relays are arranged sequentially such that causing a first of the plurality of first relays to change from the first position to the second position causes a next of the plurality of first relays to change from the first position to the second position.

4. The switching system of claim 3, wherein the controller is structured to control the first of the plurality of first relays to change from the first position to the second position and to sense when a last of the plurality of first relays changes from the first position to the second position.

5. The switching system of claim 1, wherein the controller is structured to change a position of the first relays in response to two actions, and wherein the controller is structured to not change a position of the first relays in response to less than the two actions.

6. The switching system of claim 5, further comprising:

a jumper panel having a number of jumper positions corresponding to modes, wherein the first action is selecting a mode with the controller, wherein the second action is setting a jumper in a jumper position corresponding to the selected mode, and wherein the controller is structured to change the position of the first relays corresponding to the selected mode in response to sensing the jumper in the jumper position corresponding to the selected mode.

7. The switching system of claim 3, further comprising:

a second plug panel including a number of second plugs structured to connect to the field devices, the first control system, and the second control system; and a plurality of second relays structured to selectively connect one of the second plugs with another of the second plugs, the plurality of second relays having a first position in which second plugs corresponding with the first control system are connected with second plugs corresponding to the field devices and a second position in which second plugs corresponding with the second control system are connected with second plugs corresponding to the field devices, wherein the plurality of second relays are arranged sequentially such that causing a first of the plurality of second relays to change from the first position to the second position causes a next of the plurality of second relays to change from the first position to the second position, and wherein a last of the plurality of first relays is connected to the first of the plurality of second relays such that causing the last of the plurality of first relays to change from the first position to the second position causes the first of the plurality of second relays to change from the first position to the second position.

8. The switching system of claim 1, further comprising:

an emergency override structured to set the plurality of first relays to the first position when the controller is not operational.

9. The switching system of claim 1, further comprising:

a status panel including a number of indicators structured to provide an indication of a mode of the switching system corresponding to the position of the plurality of first relays.

10. A railway control system comprising:

a number of railway field devices;

a first control system structured to communicate with the number of railway field devices;

a second control system structured to communicate with the number of railway field devices;

a switching system for selectively connecting the number of railway field devices with the first control system or the second control system, the switching system including:

a first plug panel including a number of first plugs structured to connect to the field devices, the first control system, and the second control system;

a plurality of first relays structured to selectively connect one of the first plugs with another of the first plugs, the plurality of first relays having a first position in which first plugs corresponding with the first control system are connected with first plugs corresponding to the field devices and a second position in which first plugs corresponding with the second control system are connected with first plugs corresponding to the field devices; and a controller structured to control the first relays to selectively set the first relays to the first position or the second position.

11. The railway control system of claim 10, further comprising:

a first entrance cabinet connected to the first control system;

a second entrance cabinet connected to the second control system and the field devices;

staging wires including:

first staging wires connected between the first control system and the switching system;

second staging wires connected between the field devices and the switching system; and third staging wires connected between the second control system and the switching system, and wherein the switching system is structured to control the plurality of first relays to selectively connect the first or third staging wires with the second staging wires.

12. The railway control system of claim 10, further comprising:

a first entrance cabinet connected to the first control system and the second control system;

staging wires including:

first staging wires connected between the first control system and the switching system;

second staging wires connected between the field devices and the switching system; and third staging wires connected between the second control system and the switching system, and wherein the switching system is structured to control the plurality of first relays to selectively connect the first or third staging wires with the second staging wires.

13. The railway control system of claim 10, wherein the plurality of first relays are arranged sequentially such that causing a first of the plurality of first relays to change from the first position to the second position causes a next of the plurality of first relays to change from the first position to the second position.

14. The railway control system of claim 13, wherein the controller is structured to control the first of the plurality of first relays to change from the first position to the second position and to sense when a last of the plurality of first relays changes from the first position to the second position.

15. The railway control system of claim 10, wherein the controller is structured to change a position of the first relays in response to two actions, and wherein the controller is structured to not change a position of the first relays in response to less than the two actions.

16. A remote switching system for selectively connecting railway field devices with a first control system or a second control system, the remote switching system comprising:

a number of local switching systems, each including:

a first plug panel including a number of first plugs structured to connect to the field devices, the first control system, and the second control system;

a plurality of first relays structured to selectively connect one of the first plugs with another of the first plugs, the plurality of first relays having a first position in which first plugs corresponding with the first control system are connected with first plugs corresponding to the field devices and a second position in which first plugs corresponding with the second control system are connected with first plugs corresponding to the field devices; and a first controller structured to control the first relays to selectively set the first relays to the first position or the second position; and a remote switching cabinet including:

a second controller structured to communicate with and control the first controller, and wherein the first controller is structured to control the position of the plurality of first relays in response to communication from the second controller.

17. The remote switching system of claim 16, wherein the number of local switching systems is a plurality of local switching systems, and wherein the second controller is structured to communicate with and control the first controllers associated with each of the plurality of local switching systems.

18. The remote switching system of claim 16, wherein the plurality of first relays are polarized relays structured to retain their position without power.

19. The remote switching system of claim 16, wherein the plurality of first relays are arranged sequentially such that causing a first of the plurality of first relays to change from the first position to the second position causes a next of the plurality of first relays to change from the first position to the second position.

20. The remote switching system of claim 19, wherein the first controller is structured to control the first of the plurality of first relays to change from the first position to the second position and to sense when a last of the plurality of first relays changes from the first position to the second position.

* * * * *